(12) United States Patent
Lai

(10) Patent No.: US 7,269,159 B1
(45) Date of Patent: Sep. 11, 2007

(54) UPSTREAM BANDWIDTH ALLOCATION FOR PACKET TELEPHONY IN A SHARED-MEDIA PACKET-SWITCHED ACCESS NETWORK

(75) Inventor: Wai Sum Lai, Matawan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/477,365

(22) Filed: Jan. 4, 2000

(51) Int. Cl.
*H04J 3/16* (2006.01)
*H04L 12/66* (2006.01)
*H04N 7/173* (2006.01)

(52) U.S. Cl. ............... 370/352; 370/465; 370/468; 725/109; 725/118

(58) Field of Classification Search ............... 370/229, 370/230, 280, 235, 231, 470, 466, 516, 394, 370/351, 352, 468, 395.2, 395.21, 461, 465, 370/458
See application file for complete search history.

(56) References Cited

U.S. PATENT DOCUMENTS

| | | | | |
|---|---|---|---|---|
| 4,914,650 | A | * | 4/1990 | Sriram |
| 5,247,516 | A | * | 9/1993 | Bernstein et al. |
| 5,295,140 | A | * | 3/1994 | Crisler et al. |
| 5,400,044 | A | * | 3/1995 | Thomas |
| 5,638,371 | A | * | 6/1997 | Raychaudhuri |
| 5,841,777 | A | * | 11/1998 | Cohen |
| 5,870,134 | A | * | 2/1999 | Laubach et al. |
| 5,920,571 | A | | 7/1999 | Houck et al. |
| 5,999,970 | A | * | 12/1999 | Krisbergh et al. |
| 6,324,184 | B1 | * | 11/2001 | Hou et al. |
| 6,510,162 | B1 | * | 1/2003 | Fijolek et al. |
| 6,570,849 | B1 | * | 5/2003 | Skemer |
| 6,577,642 | B1 | * | 6/2003 | Fijolek et al. |
| 6,697,435 | B2 | * | 2/2004 | Anderlind et al. .......... 375/253 |

FOREIGN PATENT DOCUMENTS

EP 1271803 * 1/2003

OTHER PUBLICATIONS

© Copyright 1999 Cable Television Laboratories, Inc. All rights reserved. "*Data-Over-Cable Service Interface Specifications*" Radio Frequency Interface Specification SP-RFlv1.1-102-990731 Interim Specification.

* cited by examiner

*Primary Examiner*—Alpus H. Hsu
*Assistant Examiner*—Steve Blount (57) ABSTRACT

A method and apparatus is provided for allocating bandwidth and reducing jitter in an upstream transmission in a shared-media packet-switched access network with multiple upstream channels offering integrated Internet Protocol voice and high-speed data services. To allow multiple simultaneous CBR (constant-bit-rate) voice connections to be supported by a cable modem, when only a single channel can be accessed at a time, a method to select an upstream channel and assign to each connection a time slot in the upstream channel is provided. Jitter, i.e. packet delay variation, results when packets associated with a voice connection are not received at expected intervals. To maintain jitter within predetermined tolerances, the sequence of mini-slots in an upstream channel is divided into frames. Each frame will have a sequence of voice and data-only regions, and the voice region is divided into non-overlapping jitter windows of generally equal length. Even when an upstream channel change is required, each active voice connection is maintained in one of the jitter windows, thereby limiting jitter to the duration of a jitter window.

22 Claims, 6 Drawing Sheets

UPSTREAM BANDWIDTH ALLOCATION FOR PACKET TELEPHONY IN A SHARED-MEDIA PACKET-SWITCHED ACCESS NETWORK

FIELD OF THE INVENTION

The present invention relates to the upstream transmission of packets in a bi-directional cable-access system offering integrated Internet Protocol voice and data services. The invention further relates to a method of allocating bandwidth for upstream transmission and reducing jitter in constant-bit-rate voice connections.

BACKGROUND OF THE INVENTION

Present day telephony networks, referred to as public-switched telephone networks (PSTNs), are built using local and toll circuit switches, with twisted wire facilities to subscribers. Due to bandwidth limitations of the plain old telephone service (POTS) offered by PSTNs, there is an inherent inability to efficiently integrate multiple types of media such as telephony, data, and television. Thus, cable television (CATV) systems, which may use a hybrid fiber-coaxial (HFC) network, are relied upon to provide sufficient bandwidth to integrate multiple types of media.

In a HFC CATV system, two-way interactivity is accomplished by augmenting a CATV broadcast network with a return path in the upstream direction (i.e., a path from the customer to the network). However, due to the relatively small part of the spectrum allocated for the upstream direction (for compatibility with TV broadcasts), and the noise characteristics therein, the bandwidths available in the two directions are asymmetrical with the upstream bandwidth being much more limited than the downstream. Presently, this is not a major problem since HFC CATV is primarily used for providing high-speed downstream data communications. In these applications, throughput-intensive downloads and file transfers typically occur in the downstream direction, and the upstream is mainly used for the transmission of small packets containing acknowledgements and commands from the users.

With the migration of PSTNs toward Internet Protocol (IP) based networks, it is envisioned that HFC CATV systems will be employed as a primary vehicle for accessing broadband integrated voice and data services supported over IP-based networks. Unlike data applications, the bi-directional bandwidth requirements of interactive voice communication are inherently symmetrical. Hence, for the efficient provisioning of voice and data offerings over a HFC CATV system, a critical issue is the development of effective methods for the proper allocation of upstream bandwidth so that quality of service objectives can be met.

U.S. Pat. No. 5,920,571, patented on Jul. 6, 1999 by W. S. Lai and D. J. Houck, discloses a method for allocating frequency and time slots in both the upstream and downstream directions of a broadband access network based on HFC CATV. However, the voice connections provided by the system described therein are circuit-switched and not packet-based. In that system, a network interface unit (which functionally corresponds to a cable modem in this invention) can handle circuit-switched calls simultaneously on different upstream channels in certain non-overlapping time slots in different accessible channels. In contrast, the invention described herein relates to packet telephony, and a cable modem operating in packet mode can access only one upstream channel at a time.

Using the Data-Over-Cable Service Interface Specifications, Radio Frequency Interface Specification, Version 1.1 (DOCSIS 1.1), transparent bi-directional transfer of Internet Protocol (IP) traffic is enabled between a cable system head-end and customer locations, over an all-coaxial or HFC CATV network. DOCSIS 1.1, as commonly referred, provides uniform, consistent, open, non-proprietary interface specifications for deploying high-speed packet-based communications systems on CATV systems that are capable of supporting a wide variety of services. Services include packet telephony, video conferencing, high-speed data, and many others.

Conventionally, a cable modem (CM), located at the customer premises, is used to transmit and receive voice and data packets over a CATV system. A cable modem termination system (CMTS), located at the head-end, schedules downstream packet transmissions and allocates bandwidth for each CM in the network to transmit packets upstream.

As specified in DOCSIS 1.1, an upstream channel, i.e., a channel for transmitting packets from a CM to a CMTS, is modeled as a stream of contiguous mini-slots. Access to these mini-slots is controlled by the CMTS. A CM can send a packet only after it has requested and obtained from the CMTS a grant, i.e., permission to use some number of contiguous mini-slots. Responding to these requests, the CMTS schedules the upstream payload transmissions through successive grants to different CMs. In data communications, each time a CM is ready to send a packet, it requests a grant from the CMTS. For constant-bit-rate (CBR) voice connections, to minimize overhead, a CMTS provides unsolicited grants to a CM for periodic upstream transmission of voice packets for each CBR connection that has been established for the CM. A time slot refers to a steady stream of periodic unsolicited grants to use succeeding contiguous sequence of mini-slots to transmit the fixed-sized voice packets generated from a CBR connection. Thus, a time slot is allocated to a CM for each CBR connection it has established.

Because of asymmetry in the available bandwidths of the upstream and downstream directions, a CMTS usually associates one downstream channel with multiple (typically up to eight) upstream channels. However, a CM can only access one of these upstream channels at a time for all its communication needs, i.e., to support up to four simultaneous voice calls and/or one "always-on" high-speed data connection.

Figure 5:
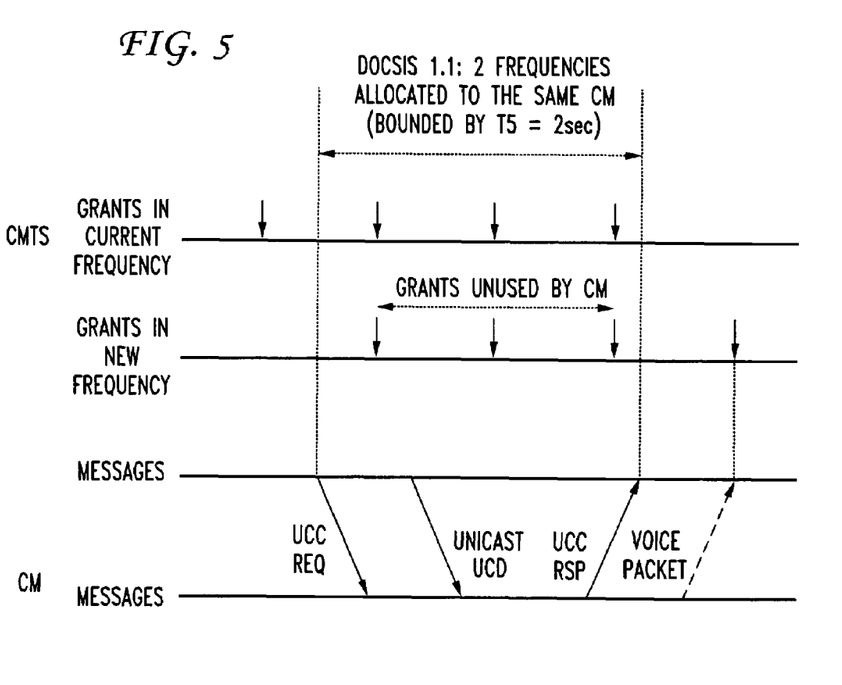
FIG. 5 shows the operation of an IUCC, using the messages specified in DOCSIS 1.1

DOCSIS 1.1 discloses that a CMTS may direct a CM to change its upstream channel for traffic balancing, noise avoidance, and other reasons. FIG. 5 shows the procedure for performing a channel change. When the CMTS determines to move a CM from the currently assigned upstream channel to another, it sends to the CM an Upstream Channel Change Request (UCC-REQ) message. In response, the CM transmits an Upstream Channel Change Response (UCC-RSP) message on the currently assigned channel to signal its readiness to use the new channel. After switching to the new channel, the CM typically performs maintenance functions to make any necessary adjustments to the timing, power, or frequency. This process is referred to as re-ranging. However, to minimize disruption (e.g., to prevent packet loss) to calls in progress on the currently assigned channel, the CM should be able to use the new channel directly without re-ranging. In this invention, such a procedure is referred to as an Immediate Upstream Channel Change (IUCC). To achieve this, the CM must know about the operating characteristics of the new channel. At periodic intervals (maximum 2s), the CMTS transmits to all CMs information about each active upstream channel via an Upstream Channel Descriptor (UCD) message. A CM should cache the UCD information regularly to avoid re-ranging in switching channels. If a CM does not cache the UCD information (e.g., due to a lack of memory), the CMTS should send a unicast message to the CM right after the UCC-REQ message, so that the CM can obtain the operating characteristics of the new channel. Typically, a CM is configured statically to use a particular upstream channel at provisioning time (e.g., at installation or power up) or on other limited occasions. Since the bandwidth of an upstream channel is limited, the number of CMs that can be supported statically by a given channel is small. To increase the total number of CMs that can be supported by a CMTS, i.e., to increase the utilization of the upstream channels, it would be useful to pool the channels together for use by any CM. That is, in addition to being provisioned initially to use a particular channel, a CMTS must be capable of assigning CMs dynamically to different channels, based on up-to-date traffic conditions. Thus, a need exists to dynamically assign CMs to different upstream channels.

Furthermore, the following situation can occur. When a new call from a CM arrives, it may happen that the upstream channel currently used by the CM may not have enough bandwidth to accommodate both existing voice connections and the new connection. However, there may be other upstream channels with enough bandwidth to do so. In this case, it would be expedient, by using the IUCC procedure, to move the existing connections of the CM from its currently assigned channel to one of these other channels, so that the new call can be established without disrupting service to existing connections. Consequently, there is a need to develop algorithms for assigning CMs dynamically to different upstream channels to increase system utilization as well as to minimize the blocking of calls.

DOCSIS 1.1 uses service identifiers (SIDs) to identify an upstream flow of packets with a particular quality of service (QoS). To support multiple simultaneous voice and data connections, a CM has several packet queues. Each packet queue, which stores packets for a pending upstream transmission, is associated with a unique SID. Based on current off-the-shelf hardware limitations, a CM can typically have only up to four packet queues, and hence up to four SIDs. They are usually used as follows: one for the high-speed data connection, one for signaling, and two for supporting up to four simultaneous voice connections resulting from up to four telephone calls initiated from telephone units connected to a CM. Since two SIDs are available to support up to four voice connections, a single SID may support multiple voice connections.

A problem arises when a single SID must support more than one voice connection simultaneously. As currently specified in DOCSIS 1.1, the CMTS maintains no explicit mapping of connections to the allocated time slots. Hence it is possible for multiple connections associated with a single SID to be jittered, while the connections supported by the SID are being established and cleared. Jitter, also referred to as packet delay variation, is the deviation, measured in units of time, from the ideal or anticipated time of receipt of each packet. Voice quality, in particular the quality of service for applications such as fax modem and dial-up data modem, are susceptible to the degenerative effects of jitter.

Figure 4A:
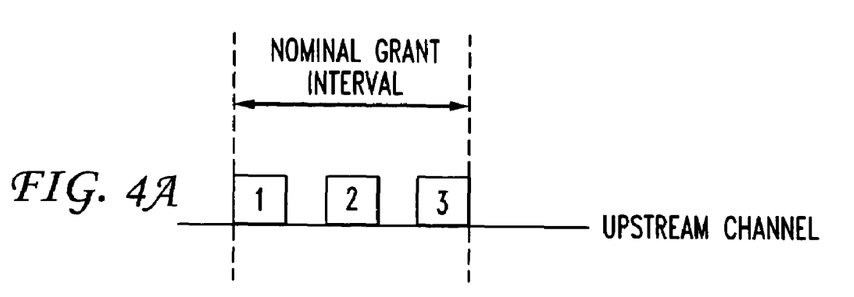
FIG. 4 depicts an example of how jitter occurs in DOCSIS 1.1 when one SID is used to support multiple voice connections.
Figure 4B:
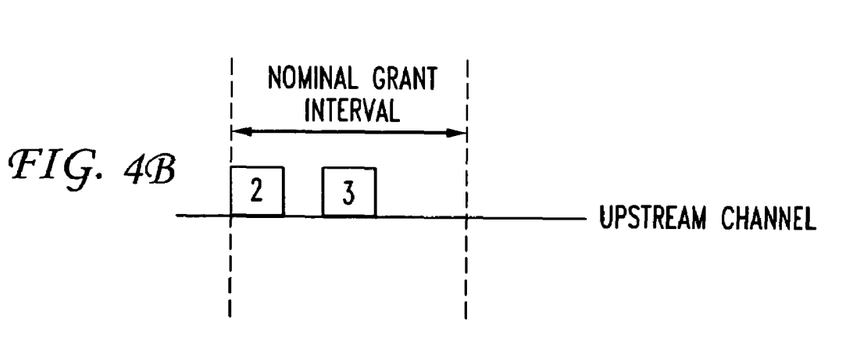

Jittering of voice connections is described herein with respect to FIG. 4. FIG. 4a shows three CBR voice connections carried by three time slots. DOCSIS 1.1 stipulates a maximum tolerated jitter interval (of unspecified length), identified as a nominal grant interval, in which the three unsolicited grants corresponding to the three time slots must fall. Since time slots are not explicitly mapped to each connection, if, for example, voice connection 1 is terminated, the CMTS does not know which time slot to drop. If the third time slot is dropped, voice connections 2 and 3 are shifted to the remaining time slots as shown in FIG. 4b. Consequently, voice packets for connections 2 and 3 are not received at the expected time, and this can lead to degradation in quality of service. Thus, a need exists to minimize jitter in order to maintain the required quality of service, while providing an adequate level of network performance, such as call blocking.

It is anticipated that future hardware capabilities will allow a CM to have more than four SIDs, so that it is possible to have exactly one call per SID. In this case, a SID will not carry multiple voice calls and the above jitter problem will not occur when allocating time slots within an upstream channel to calls from the same CM. However, even when one SID is available for each voice connection, jitter remains a problem when an IUCC is performed. When an IUCC is to be made for a CM, the relative time slot positions assigned to the CM for existing connections must still be maintained within a maximum tolerated jitter interval between the current and new upstream channels. Consequently, there remains in the art a need to dynamically assign an upstream channel to a CM to accommodate efficiently and effectively multiple simultaneous voice connections, while maintaining jitter within predetermined tolerances.

SUMMARY OF THE INVENTION

The present invention solves at least some or all of the above-mentioned problems. In one aspect of the present invention, jitter is minimized in constant-bit-rate voice connections by transmitting voice information from different connections belonging to the same CM in non-overlapping jitter windows of limited size. Upstream packets are transmitted in frames, the length of each frame being the packetization time for voice sampling. The frames contain a sequence of voice and data-only regions. The voice regions are comprised of time slots. Hereinafter, a time slot refers to a steady stream of periodic unsolicited grants to use succeeding contiguous sequence of mini-slots to transmit the fixed-sized voice packets generated from a CBR connection. In one embodiment, there are two non-overlapping jitter windows in the voice regions of a frame. The length of each jitter window, when there is an even number of time slots in the frame for voice, is the number of time slots divided by 2. If a frame has an odd number of time slots for voice, where n is the number of time slots in the frame for voice, the length of one jitter window is $(n-1)/2$, and the length of the other jitter window is $(n+1)/2$. Alternatively, a frame may comprise more than one voice region, and the frame may comprise at least two non-overlapping jitter windows, each approximately equal in size.

Another aspect of the present invention is to provide a method for selecting upstream channels and assigning time slots in a selected channel for new calls.

A further aspect of the present invention is to assign an upstream channel to a CM on a call-by-call basis.

A further aspect of the present invention is to assign an upstream channel to accommodate existing and new voice connections, and maintain voice connections, previously assigned to one jitter window, in the same jitter window in the newly selected upstream channel to minimize jitter.

Another aspect of the present invention is to assign either a CM requesting bandwidth or a CM with the least number of active calls on the same upstream channel as the CM requesting bandwidth to a new upstream channel when a channel change procedure is performed.

These and other features of the invention will be apparent upon consideration of the following detailed description and figures.

DETAILED DESCRIPTION OF THE INVENTION

Figure 1:
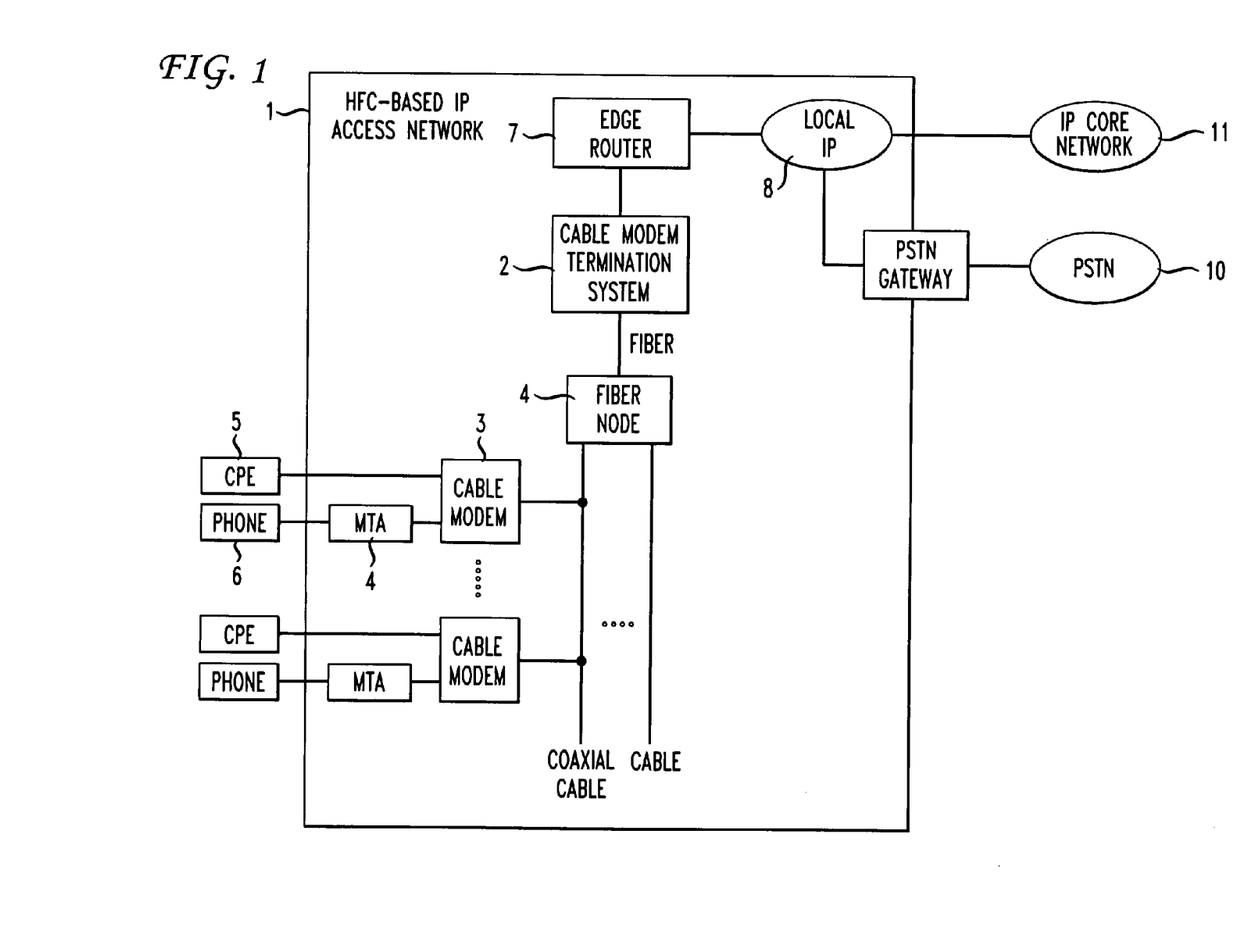
FIG. 1 is an overview block diagram depicting a hybrid fiber-coaxial (HFC) based Internet Protocol (IP) access network with cable modems (CMs) located at customer premises connected to a cable modem termination system (CMTS) using a hybrid fiber-coaxial connection.

FIG. 1 shows a preferred embodiment of a packet-based, shared-media, hybrid fiber-coaxial (HFC), Internet Protocol (IP) access network 1 connected to a conventional public-switched telephone network (PSTN) 10 for telephone calls and an IP core network 11 for Internet access. The HFC-based IP access network 1 may comprise a HFC distribution plant. However, the invention is not limited to a HFC distribution plant, and may utilize any distribution system (e.g., telephony return path, all coaxial, or fiber-to-the-curb) providing adequate, bi-directional bandwidth for voice, data, and TV communications using upstream packet transmission protocol features similar to those specified in DOCSIS 1.1. The access network 1 is connected to IP core network 11 and PSTN 10 through local IP 8 and edge router 7. The edge router 7 may be combined with the cable modem termination system (CMTS) 2. The local IP 8 contains all the network elements/servers required for connection management and call processing.

The HFC-based IP access network 1 includes a CMTS 2. The CMTS, located at the head-end, can be responsive to multiple cable modems (CMs) 3, each located in a customer premise. A CM 3 may comprise an internal or external unit connected to a personal computer (PC), or the CM may comprise a unit connected to any device providing access to the Internet, such as web-based TV devices. Also, a customer may lease or buy the CM. The HFC distribution plant includes fiber-optics between the CMTS 2 and the fiber node 4 for high-speed voice and data transmission. Fiber node 4 performs optical/electrical conversion. Coaxial cable is used to connect multiple customer premises in close proximity to fiber node 4. Customer-premises equipment 5, such as a personal computer, can interface directly with a CM 3. A telephone 6 is usually interfaced through a multi-media terminal adapter (MTA) 4 to a CM 3. The MTA 4 may be integrated with the CM 3.

The CMTS 2 and CM 3 may use DOCSIS 1.1 to transmit voice and data packets over the HFC system. However, the transmission of IP traffic between CMTS 2 and CM 3 may use other protocols with similar upstream transmission features.

The CMTS 2 performs multiple tasks. Tasks related to managing the upstream bandwidth of the HFC system include: (1) assign a channel for a CM 3 when it makes its first voice call, (2) assign a channel for a CM 3 when the Immediate Upstream Channel Change (IUCC) procedure needs to be performed, and (3) assign an idle time slot in the assigned channel to carry voice packets generated from the call. Hereinafter, an idle time slot is defined as one that is not allocated to a voice call. All these assignments by the CMTS must be performed within the jitter constraint, i.e., maintain jitter within predetermined tolerances, while providing an adequate level of network performance, such as call blocking.

Figure 2A:
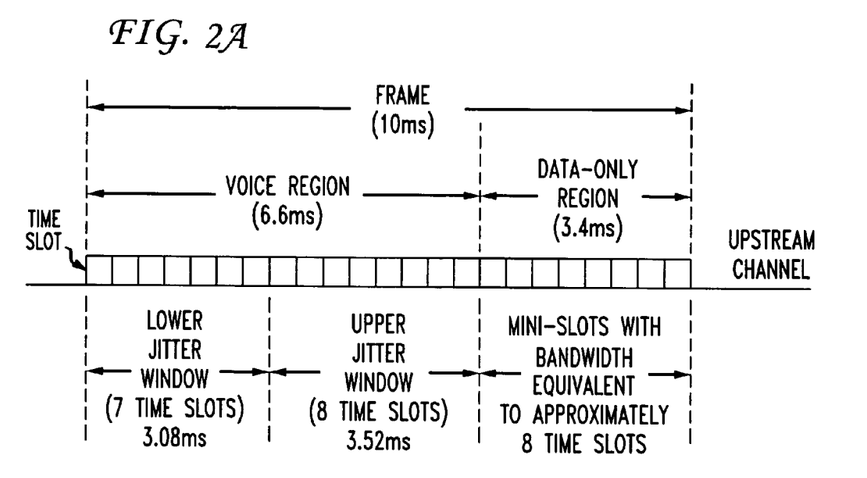
FIG. 2 shows exemplary embodiments of a frame as used in this invention.

To meet the jitter constraint, an upstream channel is divided into frames, and frames are further subdivided into regions and jitter windows. DOCSIS 1.1 models an upstream channel as a stream of mini-slots. This invention partitions the sequence of mini-slots in an upstream channel into frames, the length of each may be the packetization time for voice sampling. For most packet telephony applications over cable-access systems, this is typically 10 ms, so as to minimize speech transmission delays. However, frames of different duration may also be used and what follows still applies. Each frame is further divided into a set of fixed contiguous regions, each of which can be a data-only region or a voice region. FIG. 2A shows one preferred embodiment of a frame divided into two regions, with one voice region followed by one data-only region. A data-only region is designated for data service only, and accommodates variable-sized data packets. A voice region is for both voice and data services, with voice having priority over data. Voice packets are fixed in size.

FIG. 2A shows a frame of 10 ms duration. It illustrates a typical scenario whereby the bandwidth in a frame is split in a ratio of approximately 2:1, for sharing between voice and data services. Thus, with two regions, sixty-six percent of the frame, i.e., 6.6 ms, is allocated for the voice region and thirty-four percent, i.e., 3.4 ms, for the data-only region. In the voice region, periodic unsolicited grants, or a time slot, will be issued for each voice call established for a CM. By being fixed in size, the voice region has a certain maximum number of time slots for voice call establishment. Once this maximum is reached, no more voice calls will be accepted into this region and data service cannot use this region either. To provide adequate service, the sizing of the two regions needs to be determined by the amount of data and voice traffic to be supported. However, methods for the capacity engineering of these two regions are beyond the scope of this invention.

In FIG. 2A, the voice region of the frame is further divided into two approximately equal non-overlapping jitter windows, to maintain jitter within minimal tolerances. This division is done as follows. Suppose that the voice region has n time slots. If n is even, then each jitter window will contain n/2 time slots. Otherwise, if n is odd, then one jitter window will have (n−1)/2 time slots and the other (n+1)/2 time slots. As an example, the voice region in the frame of FIG. 2A has fifteen time slots, which is an odd number. The sizes of the two non-overlapping jitter windows are approximately equal, with seven time slots in the lower window and eight in the upper window. Furthermore, as this voice region has 6.6 ms worth of time slots, the duration of the lower window is 6.6*(7/15)=3.08 ms, while that of the upper window is 6.6*(8/15)=3.52 ms. By splitting the voice region into two approximately equal non-overlapping windows, and maintaining calls associated with the same SID within the same jitter window, jitter is limited to the duration of the jitter window. This duration is smaller than that of either the voice region or the frame. Furthermore, by arranging the jitter windows to be both non-overlapping and collectively covering the whole voice region, jitter is maximally reduced while access by a CM to channel bandwidth is maximized (and so call blocking is minimized). Also, all CMs use the same set of jitter windows, hence simplifying system management.

A preferred embodiment comprising a two-region frame is shown in FIG. 2A. However, a frame can be divided in many ways, with any pattern of voice and data-only regions, and any number of jitter windows within a voice region. To be useful, a frame should have a structure that is easy to implement, simple to manage, and yet capable of limiting jitter without compromising significantly the call blocking performance. Besides the two-region frame structure of FIG. 2A, another preferred embodiment comprises a frame partitioned into four fixed contiguous regions with alternating voice and data-only regions. That is, a frame with a sequence of four non-overlapping regions: voice region, data-only region, voice region, and data-only region. In this case, the two voice regions are approximately equal in size, with each containing only one jitter window. The sizing of these two voice regions, or respectively the two jitter windows, is the same as before, depending on whether the total number of time slots in the frame for voice is even or odd.

Figure 2B:
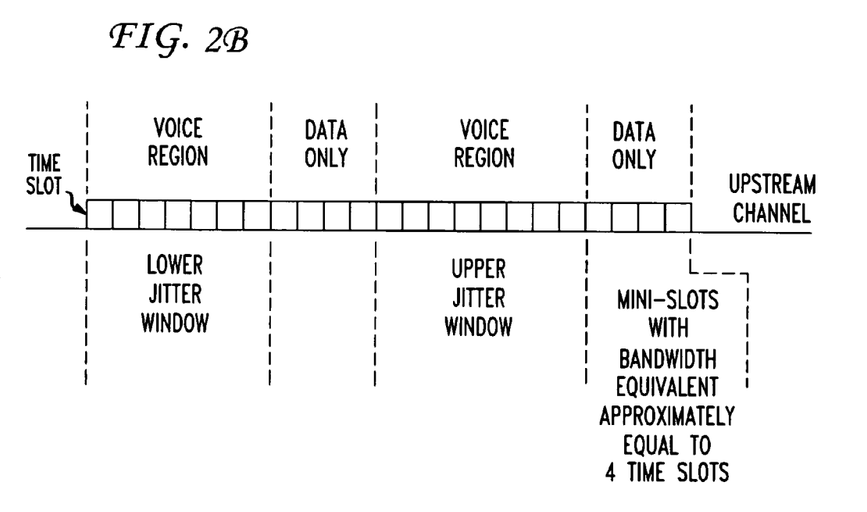

FIG. 2B shows a four-region frame. The combined size of the two voice regions is the same as that in FIG. 2A. Similarly, the respective jitter windows are of the same size. However, the voice regions are not contiguous. The advantage of the four-region frame shown in FIG. 2B over a two-region frame is that data packet delay will be reduced as there will be opportunity to send data packets after a smaller voice region.

Furthermore, although preferred embodiments have been described using two voice regions, more than two voice regions, approximately equal in size, may be used to accommodate more than two non-overlapping jitter windows. The choice of the number of non-overlapping jitter windows depends on the number of SIDs available to carry voice connections, and is a trade-off between maximum tolerable jitter, call blocking, data packet delay, and data packet fragmentation. Generally, with more SIDs, more jitter windows of smaller sizes can be used. However, the more the number of jitter windows (and hence the number of voice regions), the more the tendency for the fragmentation of large data packets. Also, this increases system complexity.

A CMTS assigns upstream channels and time slots to CMs, on a call-by-call basis, in response to their requests for call establishments. Typically, a CM is configured statically to use a particular upstream channel at provisioning time. To increase the utilization of upstream channels, in addition to being provisioned initially (e.g., at installation or at power up) to use a particular channel, a CM is dynamically allocated to an upstream channel when the CM makes a call request based on up-to-date traffic conditions.

Based on current off-the-shelf hardware limitations, a CM can typically have only up to four packet queues, and hence up to four service identifiers (SIDs). They are usually used as follows: one for the high-speed data connection, one for signaling, and two for supporting up to four voice connections. A voice-carrying SID can be used to support any number (up to four) of voice connections. Thus, a voice-carrying SID may carry no calls at all, or for a single voice-carrying SID to carry all four calls, or any other combinations. The ability of a SID to carry a random number (up to four) of calls is to minimize call blocking probability.

To limit jitter, each voice-carrying SID with at least one call in progress is dynamically and uniquely associated with one of the two jitter windows. When a SID carries no more calls, it is no longer associated with a jitter window. In future hardware, it is possible for a CM to be equipped with six or more SIDs. With six or more SIDs, four SIDs are available to carry up to four calls. Thus, in this case, it is no longer necessary for a SID to carry more than one call. A voice-carrying SID with a call in progress is still associated dynamically and uniquely with one of the two jitter windows (to limit jitter), but a jitter window can be associated with multiple voice-carrying SIDs. Although, it may be no longer necessary for each SID to carry more than one call, it is still necessary to associate each SID with a jitter window in order to maintain jitter within predetermined tolerances when an IUCC is performed.

A CM is dynamically assigned an upstream channel when it makes its first voice call request. The channel allocated will also be used to support subsequent new calls from the same CM, provided that there are idle time slots available in the voice region of the channel. If such space is not available to a new call from the CM, the CM is moved by the IUCC procedure to another upstream channel with enough idle time slots to accommodate, within jitter constraints, both existing calls as well as the new call. If such an upstream channel cannot be allocated, then the new call is blocked. Data service can also use the voice region with low priority, and thus, part or all of the mini-slots in an idle time slot may be used for the transmission of a packet from data service, at the instant when a voice call arrives.

A CMTS performs assignments of upstream channels for a CM on two occasions: (1) first call request from the CM, and (2) subsequent call requests whenever all time slots in the channel currently assigned to the CM are occupied, thereby necessitating the IUCC procedure to be performed. In either case, a channel is assignable only if it can accommodate the request, i.e., there are enough idle time slots for any established calls plus the new call, all within the jitter constraint. Thus, in selecting a channel for assignment, a CMTS first searches all the channels under its control to find the ones that meet this criterion.

Suppose that there are a total of c upstream channels under control of CMTS 2. Typically, c is no more than eight. Assuming that the channels are numbered consecutively and identified as 1 through c. Then, the CMTS can conduct the search in one of two ways. (1) Search in opposite directions, i.e., search upward from channel 1 for the first call from a CM, downward from channel c for a subsequent IUCC; or vice versa. (2) Search in same direction, i.e., search upward from channel 1 (or downward from channel c) for both the first call from a CM and a subsequent IUCC. By using one of these search procedures, CMTS 2 marks a subset of the c channels that meets the assignment criterion.

After the search is performed, CMTS 2 selects one channel out of the marked subset for assignment to a CM. One of the following four procedures can be used for this selection. (1) Packed with first fit: assign the first channel in the specified search direction. (For example, if the search upward procedure is used, then the lowest channel that meets the assignment criterion is selected.) (2) Minimally packed: assign a channel with the minimum number of idle time slots, tie breaking by the specified search direction. (Suppose there are multiple channels that meet the assignment criterion and have the same minimum number idle time slots. If the search upward procedure is used, then the lowest such channel is selected.) (3) Maximally spread: assign a channel with the maximum number of idle time slots, tie breaking by the specified search direction. (4) Random: assign a channel probabilistically.

The choice for using one of the above procedures depends on the performance desired of the upstream channels. Both the packed with first fit and minimally packed procedures, when used in conjunction with the search in the same direction procedure, tend to minimize call blocking by allocating time slots in as few channels as possible. The lesser utilized channels may then be useful to accommodate those CMs that are data-only subscribers, i.e., do not subscribe to any voice service. The maximally spread procedure, when used in conjunction with the search in opposite directions procedure, tends to balance the load among the different channels. The random procedure for channel selection also achieves load balancing.

After a channel has been selected for assignment, the CMTS selects an idle time slot in the channel and assigns it to the CM for the new call. In this selection, the CMTS can either (1) select the lowest (or highest) idle time slot, or (2) select an idle time slot randomly. For example, first select randomly a jitter window with at least one idle time slot, and then, select the lowest (or highest) idle time slot in the selected jitter window. Time slots are numbered consecutively and identified as such. Here again, the choice of these two idle time slot assignment procedures depends on the performance desired. Suppose that the lowest idle time slot in the assigned channel is selected for assignment. This gives preference to the lower jitter window for being selected. As a result, the time slots allocated to voice calls are consolidated in the low end, leaving more idle time slots in the high end that is close to the data-only region. This helps to avoid fragmentation of large data packets. On the other hand, if the lower and upper jitter windows are selected randomly, it helps to lower the call blocking probability.

Figure 3A:
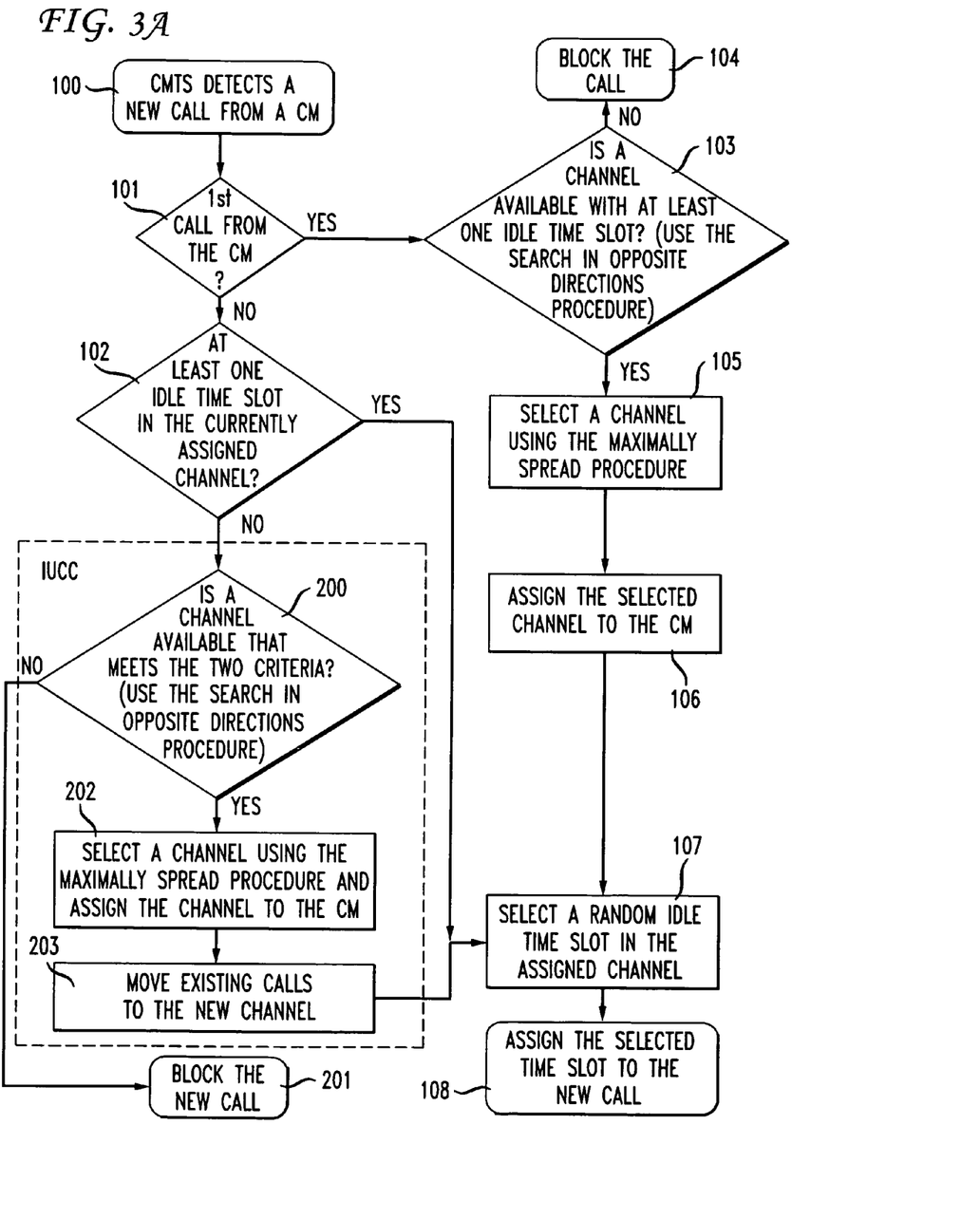
FIG. 3 is a flow-chart of the procedure for assigning time-slots and of the Immediate Upstream Channel Change (IUCC) procedure.

FIG. 3A describes the steps performed by a CMTS in assigning an upstream channel and allocating time slots to a CM within the jitter constraint. In this preferred embodiment, the maximally spread procedure, with search in opposite directions, is used for channel selection. Also, a random idle time slot in the assigned channel is selected. This combination of the search and selection procedures for upstream channels and idle time slots is intended to minimize call blocking. However, other combinations may be substituted to obtain desired performance of the system for the given needs. In step 100, the CMTS detects a new call from a CM. The CMTS determines if the new call is the first call from the CM in step 101. If the new call is the first call, then the CMTS determines using the search in opposite directions procedure, i.e. search upward from the first upstream channel for the first call, if a channel with at least one idle time slot to carry the new call is available in step 103. If no channel with an idle time slot is available, the new call is blocked. If one or more channels are available with an idle time slot, then a channel is selected (by using the maximally spread procedure) and assigned to the CM in steps 105–106. Next, a random idle time slot in the assigned channel is selected and assigned to the new call in steps 107–108.

In step 101, if the new call is not the first call from the CM, then the CMTS determines if there is at least one idle time slot in the currently assigned channel in step 102. If at least one idle time slot is available, then a random idle time slot is selected and assigned to the new call (in steps 107–108).

If there are no idle time slots available in the currently assigned channel for the new call, then the IUCC procedure is performed. In step 200, channels that meet the following two criteria are marked using the search in opposite directions procedure, i.e. search downward from the last upstream channel. (1) The number of idle time slots in each jitter window in the new channel is no less than the number of time slots allocated to the CM in the corresponding jitter window in the currently assigned channel. (2) At least one of the jitter windows in the new channel has room to accommodate the new call in addition to existing voice connections from the CM. If no channels meet the two criteria, then the new call is blocked. Otherwise, a channel is selected (by using the maximally spread procedure) from the marked subset of channels and assigned to the CM in step 202. The existing voice connections established on the currently assigned channel are moved to the new channel in step 203. In this move, the relationship of jitter windows in the current and new channels is preserved. That is, connections using time slots in the lower jitter window of the current channel will be maintained in the lower jitter window in the new channel, and connections in the upper jitter window will be maintained in the upper jitter window in the new channel. Thus, existing voice connections assigned to one jitter window in the currently assigned channel will be maintained in the same jitter window in the newly selected channel. After moving existing connections in this manner, a random idle time slot in the new channel is selected and assigned to the new call.

Figure 3B:
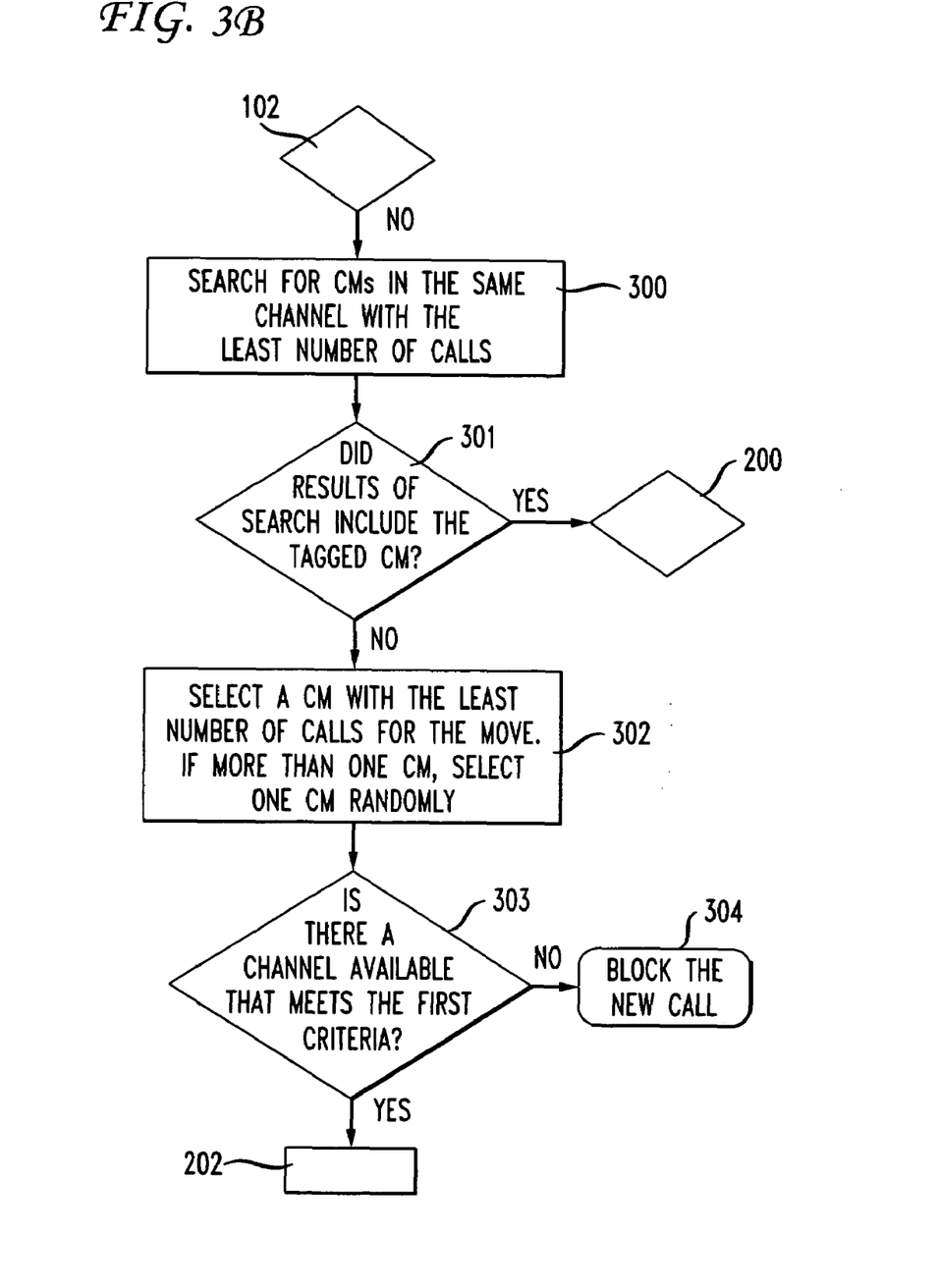

In another preferred embodiment, shown in FIG. 3B, an IUCC procedure is performed by moving a CM other than the CM with the new call. Let the CM with a new call be referred to as the tagged CM. Suppose that there is another CM that has the same assigned channel as the tagged CM, but has no more calls established than the tagged CM. If this CM is to be moved instead of the tagged CM, then only criterion (1) in step 200 of FIG. 3A needs to be satisfied. Note that, to accommodate the new call of the tagged CM in the currently assigned channel, it only needs to move another CM with only one active call, if there is one. A CM with the same or less number of established calls requires less idle time slots in a new channel than the tagged CM, since the tagged CM requires enough time slots to carry voice packets generated from established calls and a new call. Thus, there is generally a higher chance for a CM with the same or less number of established calls than the tagged CM to be successfully moved.

In step 300, shown in FIG. 3B, if (in step 102) at least one idle time slot in the currently assigned channel is not available to accommodate the new call, the CMTS searches for CMs on the same channel with the least number of active calls. In step 301, CMTS 2 determines if the tagged CM was included in the results of the search. If the tagged CM was included, then move the tagged CM by going to step 200 and using the rest of the procedure in FIG. 3A. Otherwise, the CM with the least number of active calls is selected for the move in step 302. If there are several CMs, other than the tagged CM, that have the same least number of active calls, then randomly select one for the move.

After a CM other than the tagged CM has been selected for the move, step 200 of FIG. 3A can now be performed, except that only criterion (1) needs to be satisfied. This is illustrated in step 303. If this criterion fails, then the new call of the tagged CM is blocked in step 304. Otherwise, steps 202 and 203 are performed for the selected CM (not the tagged CM). This is followed by steps 107 and 108 for the new call of the tagged CM in its currently assigned channel.

What has been described are the preferred embodiments of the present invention. However, it will be readily apparent to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. A method of reducing jitter in a shared-media packet-switched access network offering integrated Internet Protocol voice and data services comprising the steps of:
    transmitting packets in an upstream channel in a frame, said frame comprising one or more voice regions having fixed size;
    establishing at least two non-overlapping jitter windows in said one or more voice regions, each of said at least two jitter windows comprising a plurality of time slots for carrying voice packets, and said at least two jitter windows collectively covering the entire one or more voice regions; and
    wherein said jitter windows are established such that packet delay variation of calls being transmitted within each of said jitter windows is maintained within an acceptable tolerance when voice packets associated with a call are shifted between time slots.

2. The method of claim 1 wherein said step of establishing at least two non-overlapping jitter windows in said one or more voice regions further includes:
    establishing only two non-overlapping jitter windows, where n is the number of time slots in said one or more voice regions, defining the length of each of said two non-overlapping jitter windows as n/2 for an even number of time slots in the voice region, or
    for an odd number of time slots in said one or more voice regions, defining the length of one non-overlapping jitter window as (n−1)/2, and the length of the other jitter window as (n+1)/2.

3. The method of claim 1 wherein said shared-media packet-switched access network is connected to a distribution plant comprising one of hybrid fiber-coaxial, coaxial, or fiber-to-the-curb.

4. The method of claim 1 wherein said jitter windows are established in one voice region.

5. The method of claim 1 wherein said jitter windows are established in two voice regions separated by a data-only region.

6. The method of claim 1 wherein said step of establishing at least two non-overlapping jitter windows further includes:
    establishing more than two non-overlapping jitter windows.

7. The method of claim 6 wherein the lengths of each of said more than two non-overlapping jitter windows are approximately equal.

8. A method of allocating a new upstream channel to accommodate at least one new voice connection in a shared-media packet-switched access network offering integrated Internet Protocol voice and data services, wherein a current upstream channel is carrying one or more existing voice connections, each of said existing voice connections being assigned to one or more jitter windows comprising a plurality of time slots for carrying voice packets, said method comprising the steps of:
    selecting a new upstream channel with at least one idle time slot to accommodate said at least one new voice connection and said one or more existing voice connections,
    assigning time slots in said new upstream channel to carry voice packets generated from said new and existing voice connections, such that voice packets from said one or more existing voice connections maintain jitter window assignments in the new upstream channel corresponding to the jitter window assignments in the current upstream channel.

9. The method of claim 8 wherein said new upstream channel is selected such that,
    (1) the number of idle time slots in each jitter window in said new upstream channel being no less than the number of idle time slots allocated to a corresponding jitter window in said current upstream channel accommodating existing voice connections, and
    (2) at least one of the jitter windows in said new upstream channel accommodating voice packets from said new and existing voice connections.

10. The method of claim 8 wherein said step of selecting a new upstream channel further includes selecting one of a packed with first fit, minimally packed or maximally spread upstream channel.

11. The method of claim 8 wherein said step of assigning time slots further includes assigning an idle time slot for said new voice connection by selecting one of a lowest idle time slot, a highest idle time slot or randomly selecting an idle time slot.

12. The method of claim 8 wherein said voice connections are constant-bit-rate voice connections.

13. A shared-media packet-switched access network offering integrated Internet Protocol voice and data services comprising:
    a cable modem located at a customer-end of an access network;
    a cable modem termination system located at a head-end of an access network;
    at least one upstream channel for transmitting voice and data packets from said cable modem to said cable modem termination system; wherein
    said packets are transmitted in a frame comprising at least one voice region having fixed size, wherein said at least one voice region comprises at least two non-overlapping jitter windows, and wherein each of said at least two jitter windows comprises a plurality of time slots for carrying said voice packets, and said at least two jitter windows collectively covering the entire voice region; and
    wherein said jitter windows are configured such that packet delay variation of calls being transmitted within each of said jitter windows is maintained within an acceptable tolerance when voice packets associated with a call are shifted between time slots.

14. The network of claim 13, wherein said frame comprises two non-overlapping jitter windows in two voice regions, n being the number of time slots in the voice region, defining the length of each of said two non-overlapping jitter windows as n/2 for an even number of time slots in the voice region, or for an odd number of time slots in the voice region, defining the length of one non-overlapping jitter window as (n−1)/2, and the length of the other jitter window as (n+1)/2.

15. The network of claim 13, wherein said cable modem termination system assigns said at least one upstream channel to said cable modem by selecting one of a packed with first fit, minimally packed or maximally spread upstream channel.

16. The network of claim 13, wherein said cable modem termination system selects one of a lowest idle time slot, a highest idle time slot or randomly selecting an idle time slot to carry said voice packets.

17. The network of claim 13, wherein said cable modem termination system assigns a new upstream channel, with at least one idle time slot, to said cable modem when said at least one upstream channel cannot accommodate a new voice connection from said cable modem.

18. The network of claim 17, wherein said cable modem termination system selects said new upstream channel based on the following:
   (1) the number of idle time slots in each jitter window in said new upstream channel being no less than the number of idle time slots allocated to a corresponding jitter window in a current channel accommodating existing voice connections, and
   (2) at least one of the jitter windows in said new upstream channel can accommodate voice packets from said new and existing voice connections.

19. The network of claim 13, wherein said access network includes one of hybrid fiber coaxial, coaxial or fiber-to-the-curb.

20. The network of claim 13, wherein said at least two non-overlapping jitter windows includes more than two non-overlapping jitter windows.

21. The network of claim 20, wherein the lengths of each of said more than two non-overlapping jitter windows are approximately equal.

22. A shared-media packet-switched access network offering integrated Internet Protocol voice and data services comprising:
   at least one upstream channel for transmitting voice and data packets to said cable modem termination system; wherein
   said packets are transmitted in frames comprising at least one voice region having fixed size, wherein said at least one voice region comprises two non-overlapping jitter windows collectively covering said voice region, each of said two jitter windows comprising a plurality of time slots for carrying voice packets; and
   wherein said jitter windows are configured such that packet delay variation of calls being transmitted within each of said jitter windows is maintained within an acceptable tolerance when voice packets associated with a call are shifted between time slots.

* * * * *